Patented May 24, 1932

1,859,583

UNITED STATES PATENT OFFICE

JOYCE H. CROWELL, OF BUFFALO, NEW YORK, ASSIGNOR TO NATIONAL ANILINE & CHEMICAL CO., INC., OF NEW YORK, N. Y., A CORPORATION OF NEW YORK

METHOD OF PRODUCING DINITROANTHRARUFINEDISULPHONIC ACID

No Drawing.   Application filed February 13, 1926. Serial No. 88,148.

This invention relates to improvements in the production of pure or purified dinitrodihydroxyanthraquinone disulphonic acids, particularly dinitroanthrarufine disulphonic acid and dinitrochrysazine disulphonic acid which have respectively the following probable formulæ:

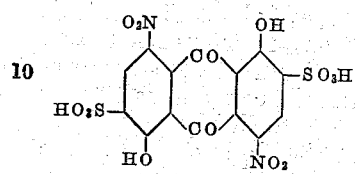

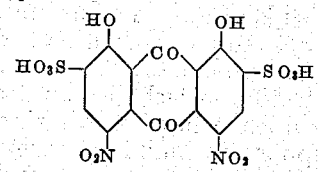

It is well known that dinitroanthrarufine disulphonic acid and dinitrochrysazine disulphonic acid, or mixtures of the same, are intermediate products employed for the production, by the action of suitable reducing agents, of the corresponding diamino-disulphonic acids which are valuable dyestuffs.

In the production of dinitroanthrarufine disulphonic acid or dinitrochrysazine disulphonic acid, it is common practice to first sulphonate anthrarufine or chrysazine by the action of oleum, and then nitrate, without isolation, the resulting disulphonic acid by treating the sulphonation mixture with a nitrating agent, e. g., with a mixture of sulphuric and nitric acids. When the nitration is complete, it has been heretofore proposed to filter off the free dinitrodisulphonic acid which separates out, dissolve it in hot water and re-precipitate it, as the sodium salt in case of the anthrarufine derivative and as the potassium salt in case of the chrysazine derivative, by the addition of sodium (or potassium) chloride to the hot solution and allowing to cool.

According to the present invention, it has been found in the sulphonation and subsequent nitration of anthrarufine, or of mixtures of anthrarufine and chrysazine, and particularly the commercial or technical products, for the production of their dinitro-disulphonic acids that a certain amount of material is usually produced, or may be present, which is insoluble in dilute acid and which, if not removed, produces a deleterious and injurious effect, such as dullness, etc., on the quality of the corresponding diaminodisulphonic acid dyestuffs to which the dinitrodisulphonic acids are subsequently reduced. The removal of this insoluble matter, when present, constitutes a part of the present invention.

It has been further found in salting out the dinitro-disulphonic acids of anthrarufine, or of mixtures of anthrarufine and chrysazine, from solution, particularly the solution obtained by diluting with water the mass ordinarily produced in the sulphonation and subsequent nitration of technical anthrarufine, or of technical mixtures of anthrarufine and chrysazine, and more especially after said solution has been filtered from any insoluble matter present, that a superior product can be obtained by the slow addition, with stirring, of sodium or potassium chloride, preferably in solution. In this manner, the sodium or potassium salts of the dinitro-sulphonic acids are caused to precipitate slowly and are obtained in a more crystalline and a much purer state than when they are precipitated by adding sodium or potassium chloride rapidly or substantially all at once. This method of precipitation, which effects a purification, also constitutes a part of the present invention.

In carrying out the invention, the sulphuric acid solution or suspension of dinitroanthrarufine-disulphonic acid, or mixture thereof with dinitrochrysazine-disulphonic acid, which, for example, has been obtained by the sulphonation and nitration of technical anthrarufine, or mixture thereof with chrysazine, according to common practice, or by any other suitable method, is diluted with water and any insoluble matter is filtered off. To the well-stirred filtrate there is then slowly added potassium chloride (or other soluble sodium or alkali metal salt), thereby causing the slow precipitation of the dinitroanthrarufine-disulphonic acid, or mixture thereof with dinitrochrysazine-disulphonic acid, in the form of the corresponding alkali metal salt, or salts, which is subsequently filtered off in any suitable manner.

The following specific example will further illustrate the invention, but it is understood that the invention is not limited thereto. The parts are by weight.

*Example.*—The mixture resulting from the sulphonation and nitration of anthrarufine, and obtained in any suitable or well known manner, for example, by the sulphonation of 40 parts of commercial anthrarufine with about 150 to 200 parts of fifteen to twenty percent oleum and subsequent nitration of the sulphonation mixture by the addition of about 80 to 240 parts of 66° Bé. sulphuric acid and of about 80 to 200 parts of a mixture composed of about 75 to 90 parts of concentrated sulphuric acid and 10 to 20 parts of nitric acid, is poured with stirring into sufficient cold water (about 2000 to 4000 parts) to give a solution containing about 10 to 20 percent, preferably about 15 percent, of sulphuric acid. It is then filtered to remove the insoluble material which may be present. To the filtrate, while well stirred and maintained, at a temperature of about 15°–45° C., preferably about 30°–35° C., there is uniformly added over a period of about one and one-half to three hours about 40 to 50 parts of common salt in the form of a 15 percent aqueous solution. After stirring for an additional 1 to 2 hours, there is slowly added with good stirring, solid sodium chloride until no further precipitation of the sodium salts of the dinitro-disulphonic acids of anthrarufine or chrysazine takes place. This usually requires the addition of sufficient salt over a period of 2 or more hours to give a 15 to 24 percent solution. The mixture is cooled to about 12° to 15° C., and the precipitated sodium salts of dinitroanthrarufine-disulphonic acid and dinitrochrysazine-disulphonic acid are filtered off and washed with a small amount of a 15 percent salt solution.

The product thus obtained filters well, is of superior purity, and when converted by suitable reduction to the corresponding diaminoanthrarufine-disulphonic acid yields a dyestuff which dyes wool in greener and brighter shades of blue than a dyestuff similarly produced without removal of the insoluble material or which has been precipitated rapidly, or both.

It is understood that the proportions and conditions given in the above example may be varied over a wide range without departing from the spirit or the scope of the invention.

I claim:

1. In the production of dinitroanthrarufine disulphonic acid by the sulphonation and nitration of anthrarufine, a method which comprises diluting the nitrated sulphonation mixture with water to produce a dilute acid solution in which impurities are insoluble and filtering off the insoluble matter.

2. In the production of dinitroanthrarufine-disulphonic acid by the sulphonation and nitration of anthrarufine, a method which comprises diluting the nitrated sulphonation mixture with water to produce a dilute acid solution in which impurities are insoluble, removing the insoluble matter, and then slowly adding to the well-stirred solution a soluble alkali metal salt whereby an alkali metal salt of dinitroanthrarufine-disulphonic acid is slowly precipitated.

3. In the production of a mixture of the dinitro-disulphonic acids of anthrarufine and chrysazine by the sulphonation and nitration of a mixture of anthrarufine and chrysazine, a method which comprises diluting the nitrated sulphonation mixture with sufficient water to produce a solution containing about 10 to 20 percent sulphuric acid, filtering off the insoluble matter, and to the well agitated filtrate at a temperature of about 15° to 45° C. first adding a solution of common salt and then solid common salt until no further precipitation takes place, the common salt being added at such a rate as to slowly precipitate the sodium salts of the dinitro-disulphonic acids of anthrarufine and chrysazine.

4. In the production of dinitroanthrarufine disulphonic acid by the sulphonation and nitration of technical anthrarufine, the process which comprises diluting the nitrated sulphonation mixture with water, filtering off the insoluble residue, and adding to the filtrate a soluble alkali metal salt at such a rate as to slowly precipitate an alkali metal salt of dinitroanthrarufinedisulphonic acid.

5. In the production of dinitro-anthrarufine disulphonic acid by the sulphonation and nitration of anthrarufine, the improvement which comprises diluting the nitrated sulphonation mixture with sufficient water to produce a solution containing about 10 to 20 per cent sulphuric acid, and filtering off the insoluble matter.

6. In the production of dinitroanthrarufine-disulphonic acid by the sulphonation and nitration of technical anthrarufine, a method of producing a purified dinitroanthrarufine-disulphonic acid in the form of its sodium salt which comprises diluting the nitrated sulphonation mixture with sufficient water to produce a solution containing about 10 to 20 per cent of sulphuric acid, filtering off the insoluble matter, and then adding common salt to the well-stirred filtrate at such a rate as slowly to precipitate the sodium salt of dinitro-anthrarufine-disulphonic acid.

7. In the production of dinitroanthrarufine-disulphonic acid by the sulphonation and nitration of anthrarufine, a method which comprises diluting the nitrated sulphonation mixture with water to produce a dilute acid solution in which impurities are insoluble, removing the insoluble matter, adding to the well agitated resulting solution first a solution of a soluble alkali metal salt and then the alkali metal salt in solid form, the alkali metal salt being added at such a rate as slowly to precipitate the alkali metal salt of dinitroanthrarufine-disulphonic acid.

8. In the production of a mixture of the dinitro-disulphonic acids of anthrarufine and chrysazine by the sulphonation and nitration of a mixture of anthrarufine and chrysazine, a method which comprises diluting the nitrated sulphonation mixture with sufficient water to produce a solution containing about 10 to 20 per cent sulphuric acid, filtering off the insoluble matter, and to the well agitated filtrate at a temperature of about 15° to 45° C., first adding an aqueous solution of a soluble alkali metal salt and then the alkali metal salt in solid form, the alkali metal salt being added at such a rate as slowly to precipitate the alkali metal salts of the dinitro-disulphonic acids of anthrarufine and chrysazine.

In testimony whereof I affix my signature.

JOYCE H. CROWELL.